(12) United States Patent
Salamon

(10) Patent No.: US 12,367,323 B2
(45) Date of Patent: Jul. 22, 2025

(54) SECURITY THROUGH RANDOMIZED DYNAMIC KEYBOARD OR KEYPAD TRANSFORMATION

(71) Applicant: Dell Products, L.P., Round Rock, TX (US)

(72) Inventor: Victor Salamon, Edmonton (CA)

(73) Assignee: Dell Products, L.P., Round Rock, TX (US)

( * ) Notice: Subject to any disclaimer, the term of this patent is extended or adjusted under 35 U.S.C. 154(b) by 268 days.

(21) Appl. No.: 18/299,222

(22) Filed: Apr. 12, 2023

(65) Prior Publication Data

US 2024/0346189 A1 Oct. 17, 2024

(51) Int. Cl.
G06F 21/83 (2013.01)
G06F 21/31 (2013.01)

(52) U.S. Cl.
CPC .............. *G06F 21/83* (2013.01); *G06F 21/31* (2013.01)

(58) Field of Classification Search
CPC ................................. G06F 21/83; G06F 21/31
See application file for complete search history.

(56) References Cited

U.S. PATENT DOCUMENTS

| | | | | |
|---|---|---|---|---|
| 8,520,848 B1* | 8/2013 | Liu | ....................... | H04L 63/083 380/52 |
| 11,551,220 B2* | 1/2023 | Quentin | ................ | G06Q 20/353 |
| 11,558,375 B1* | 1/2023 | Cao | ....................... | H04L 9/3226 |
| 2007/0118876 A1* | 5/2007 | Singh | .................... | H04L 63/107 726/2 |
| 2009/0044282 A1* | 2/2009 | Govindaraju | ............ | G09C 1/00 708/250 |
| 2012/0323788 A1* | 12/2012 | Keresman, III | ...... | G07F 7/1041 705/44 |
| 2014/0096201 A1* | 4/2014 | Gupta | ..................... | G06F 21/83 726/4 |

(Continued)

OTHER PUBLICATIONS

Hamid HR, Abdullah NY. Physical authentication using random No. generated (rng) keypad based on one time pad (otp) concept. In2015 Fourth International Conference on Cyber Security, Cyber Warfare, and Digital Forensic (CyberSec) Oct. 2, 20159 (pp. 135-139). IEEE. (Year: 2015).*

(Continued)

*Primary Examiner* — James R Turchen
(74) *Attorney, Agent, or Firm* — Fogarty LLP

(57) ABSTRACT

An information handling system (IHS) (e.g., a terminal, automated teller machine, etc.) initiates a password input session, creates a Random Transformation Algorithm (RTA) for the input session, instructs an IHS user to apply the RTA to entry of a key sequence of the password, accepts entry of the key sequence from the user via an IHS keyboard and/or keypad, and reverses transformation of the user entry of the key sequence in accordance with the RTA logically arriving at the password. The IHS may then (encrypt and) send the password to a server for authentication. The RTA may swap keyboard and/or keypad characters by position and/or value, shift keyboard and/or keypad character values up or down, geometrically move keyboard and/or keypad characters, and/or rotate keyboard and/or keypad characters about an axis. The instructions may be communicated to the user via a third party device, the keyboard, a display, or the like.

18 Claims, 6 Drawing Sheets

(56) References Cited

U.S. PATENT DOCUMENTS

| | | | | |
|---|---|---|---|---|
| 2014/0245433 | A1* | 8/2014 | Bao | G06F 21/31 |
| | | | | 726/19 |
| 2015/0134526 | A1* | 5/2015 | Russell | G06F 21/31 |
| | | | | 705/44 |
| 2016/0117494 | A1* | 4/2016 | Kaplan | G06F 21/31 |
| | | | | 726/18 |
| 2016/0381009 | A1* | 12/2016 | Liou | H04L 63/0838 |
| | | | | 726/7 |
| 2019/0377863 | A1* | 12/2019 | Zhao | G06F 21/36 |
| 2020/0134168 | A1* | 4/2020 | Hwang | G06F 21/36 |
| 2021/0390168 | A1* | 12/2021 | Yarabolu | G06F 21/51 |

OTHER PUBLICATIONS

Lyu S, Yao Q, Song J. AvoidPwd: A mnemonic password generation strategy based on keyboard transformation. China Communications. Aug. 25, 2022;19(10):92-101. (Year: 2022).*

Maiti A, Crager K. Randompad: Usability of randomized mobile keypads for defeating inference attacks. InProceedings of the IEEE Euro S&P Workshop on Innovations in Mobile Privacy & Security (IMPS) Jan. 2017. (Year: 2017).*

* cited by examiner

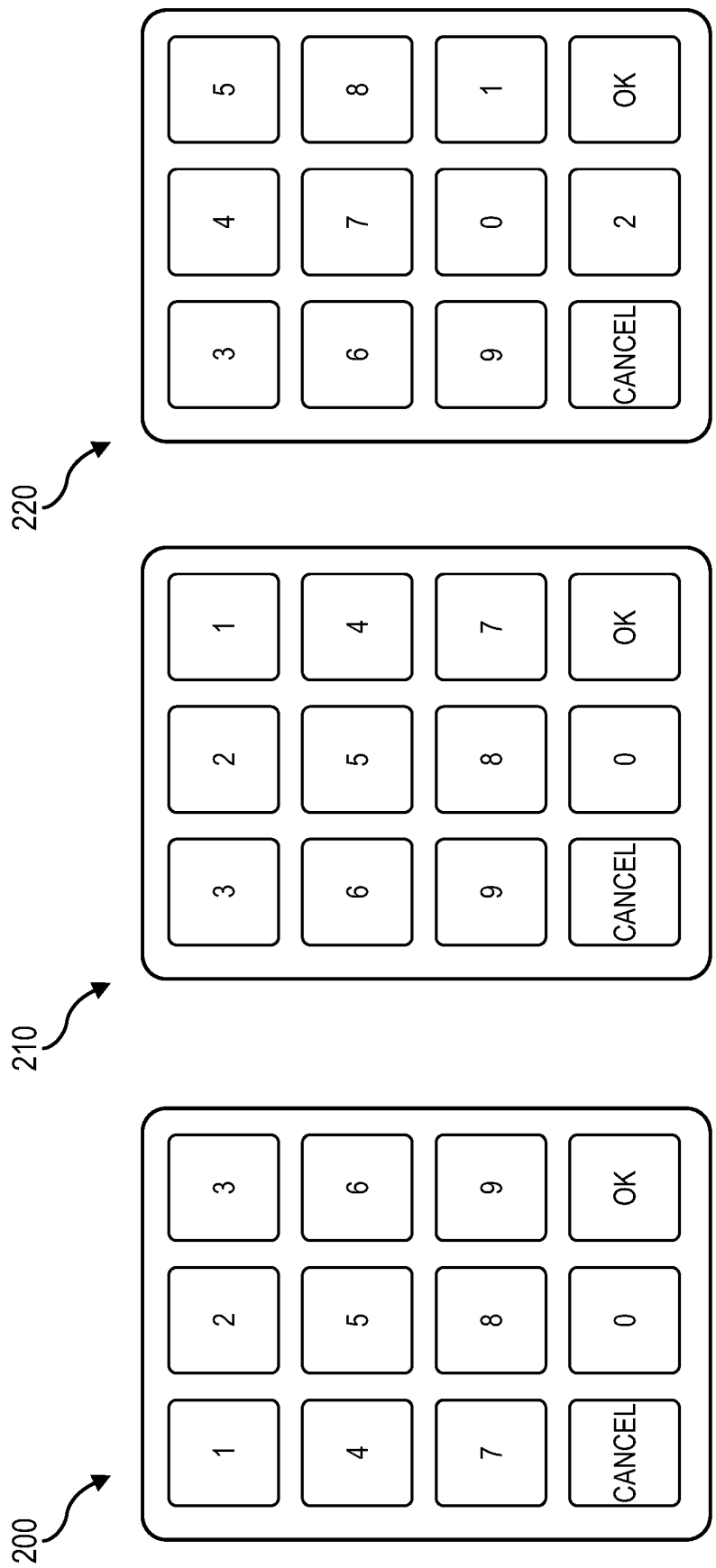

SECURITY THROUGH RANDOMIZED DYNAMIC KEYBOARD OR KEYPAD TRANSFORMATION

FIELD

This disclosure relates generally to Information Handling Systems (IHSs), more specifically to implementation of security for keyboard or keypad entry, and particularly to security through (by) randomized dynamic keyboard or keypad transformation.

BACKGROUND

As the value and use of information continues to increase, individuals and businesses seek additional ways to process and store information. One option available to users is information handling systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A basic IHS user authentication point is a physical terminal, such as a keypad on an Automated Teller Machine (ATM), or the keyboard on a computer terminal. A basic way to steal a user's password is through the keyboard or Personal Identification Number (PIN) keypad ("pinpad") they use to authenticate. In case of a high value target (such as a government official, or financial institution employees), an attacker will go out of their way to steal these passwords, including using state-of-the-art attack vectors. One of the basic attack vectors against terminal authentication is PIN/password snooping. An attacker can (remotely) observe the key sequence a user types. For example, an attacker can observe and record what is being typed, using a high powered/long distance telescope. In cases of both short key sequences (such as at an ATM pinpad (keypad), or the like) or long key sequences (e.g., a Secure Shell Protocol (SSH) passphrase, or the like), the sequence can simply be observed/recorded, for later playback and processing, to prepare an authentication attack. Additionally, surveillance system cameras, and the like (e.g., doorbell cameras, traffic cameras, security cameras) are very prevalent in today's society and may be exploited to monitor keyboard or keypad inputs, whether they are intentionally intended to do so, or not.

Existing solutions which attempt to protect A PIN or password key sequence against snooping include rudimentary, physical efforts such as covering the pinpad or keyboard while typing, or in the case of a small numerical-only pinpad (square, nine-digit area), the pinpad can be covered by one hand, while the other hand types. In general, for both pinpads and keyboards, there may be a physical cover over the keys, blocking remote observation. Further, state-of-the-art attack vectors that may be used in this regard may include by way of example key-logging malware, or the like. Further existing solutions may use biometrics to improve the security of logins, by requiring biometrics to amend or replace PIN sequences or passphrases, and/or may use Multi Factor Authentication (MFA) to increase the security of login session by asking for an additional independent verification (identity or separate value/token).

SUMMARY

Embodiments of security through (by) randomized dynamic keyboard or keypad transformation are described. In an illustrative, non-limiting example an information handling system (IHS), which may be a terminal such as an Automated Teller Machine (ATM), or the like, may be configured to initiate a password input session, create a Random Transformation Algorithm (RTA) for the password input session, instruct a user of the IHS to apply the RTA to entry of a key sequence of the password, accept entry of the key sequence from the user, via an IHS keyboard and/or keypad, and reverse transformation of the user entry of the key sequence in accordance with the RTA to logically arrive at the password. Additionally, following reversing transformation of the entry of the key sequence, the IHS may (encrypt and) send the password to a server for authentication.

In accordance with various aspects, the RTA may swap keyboard and/or keypad characters by position, swapping keyboard and/or keypad characters by value, shift keyboard and/or keypad character values up or down by a particular amount, geometrically move keyboard and/or keypad characters in a particular direction by a particular amount, and/or rotate keyboard and/or keypad characters in a particular direction about an axis, by a particular amount.

The IHS may, in accordance with various aspects, instruct the user to apply the RTA to entry of the key sequence of the password by communicating RTA instructions to the user via a third party device, via the keyboard, via a display of the IHS, or the like.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 2A is a diagrammatic illustration of an example of a typical pinpad (keypad).

FIG. 2B is a diagrammatic illustration of an example of a dynamic transformation where the key values of the pinpad of FIG. 2A are changed by being swapped by position, in accordance with some embodiments.

FIG. 2C is a diagrammatic illustration of an example of a dynamic transformation where the key values of the pinpad of FIG. 2A are changed by making each character have a value of the original, plus two, in accordance with some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. Specifically, embodiments of the present systems and methods may be used in, or in conjunction with, IHSs in the form of physical terminals, such as computer terminals, Automated Teller Machines (ATMs), or the like. An IHS may include random access memory (RAM), one or more processing resources such as a central processing unit (CPU) or hardware or software control logic, ROM, and/or other types of nonvolatile memory. Additional components of the IHS may include one or more storage devices, one or more network ports for communicating with external devices as well as various input and output (I/O) devices, such as a keypad, pinpad keyboard, a mouse, touchscreen and/or a video display. As used herein, the term "keypad" or "pinpad" refers to block or pad of buttons set with an arrangement of numeric digits (e.g., zero to nine), symbols or the like, entry and deletion keys, and the term "keyboard" refers to a block or pad of buttons set with an arrangement of alphanumeric characters (e.g., "a" through "z" and zero to nine) and symbols or the like, entry and deletion keys. The phrase "keyboard and/or keypad" may refer variously to 1) a keypad or 2) a keyboard or 3) a keyboard with a (n) (integral) keypad. The IHS may also include one or more buses operable to transmit communications between the various hardware components. A more detailed example of an IHS is described with respect to FIG. 1.

Figure 1:
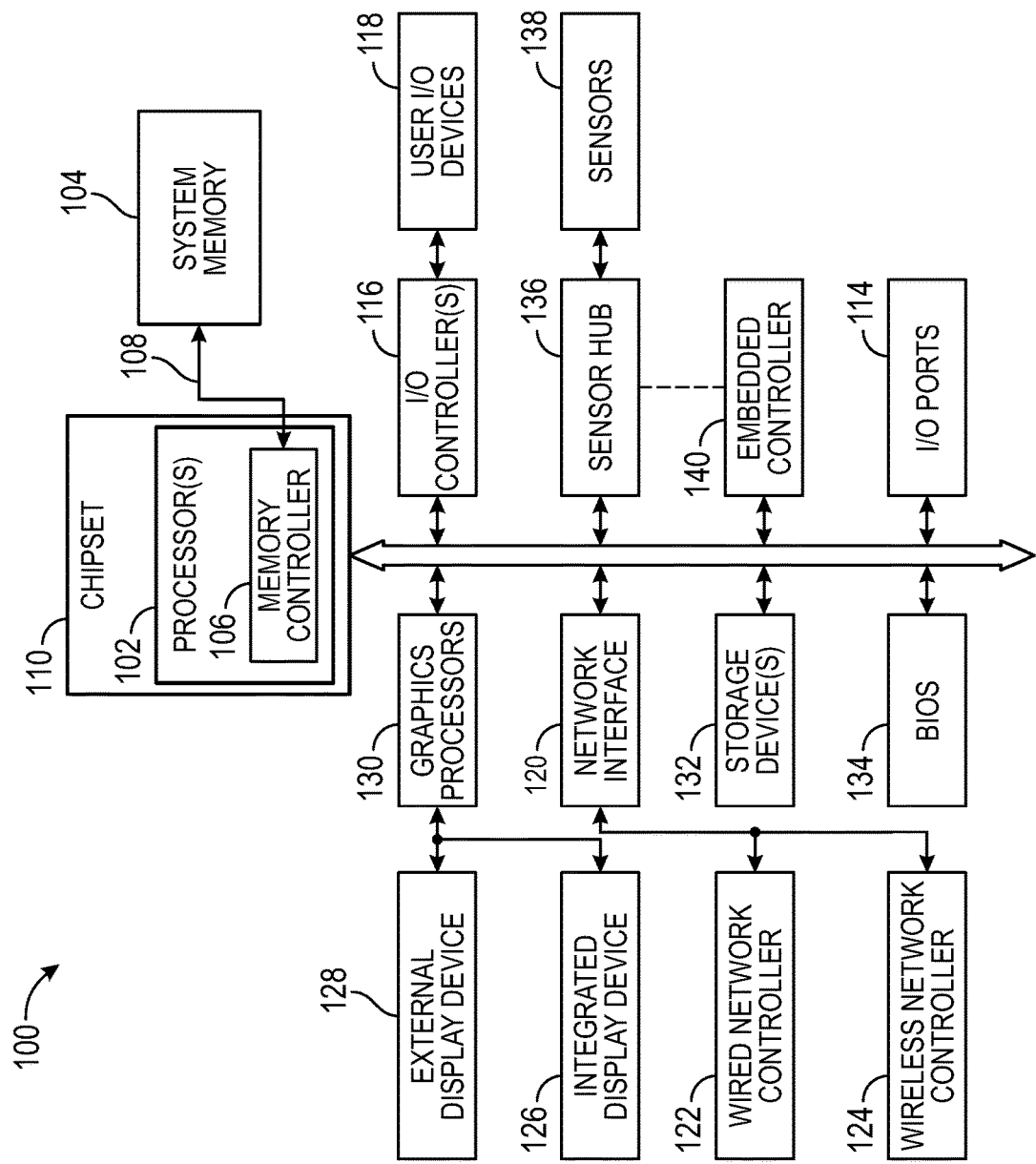
FIG. 1 is a block diagram illustrating components of an example of an Information Handling System (IHS), according to some embodiments.

FIG. 1 is a block diagram of an example of internal components of (end-point device) IHS 100, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC?, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, pinpad, numeric keypad, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLUETOOTH, in accordance with various embodiments of the present systems and methods, Wi-Fi, Ethernet and mobile cellular networks (e.g., CDMA, TDMA, LTE). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, IOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC. Additionally, or alternatively, the subject (endpoint) IHS (e.g., an IoT device) may be, or at least employ, a single board computer or the like. For example, some embodiments of the present systems and methods may be, or make use of, a "smart" keypad and/or keyboard, which may include such a SoC, single board computer, an Application Specific Integrated Circuit (ASIC), or the like, programmed in accordance with embodiments of the present systems and methods.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be used or performed, and/or other additional operations may be available. Further, a person of ordinary skill will recognize that IHS 100 of FIG. 1 is only one example of a system in which the certain embodiments may be utilized. Indeed, the embodiments described herein may be used in various further electronic devices, such as network router devices, televisions, custom telecommunications equipment for special purpose use, etc. For example embodiments of the present systems and methods may be practiced by, in or in conjunction with an ATM, (dumb) computer terminals, or the like which may particularly be comprised of fewer components or components may be distributed across additional systems (e.g., a server, or the like) and/or the operations of some of the illustrated components may not be used or performed, and/or other additional operations may be available in such ATMs, (dumb) computer terminals, or the like. That is, certain techniques described herein are in no way limited to use with IHS 100 as illustrated in FIG. 1.

Embodiments of the present systems and methods are directed to implementation of security for keyboard or keypad entry, and particularly to security through randomized dynamic keyboard or keypad transformation. Herein, the term "password" is variously used to denote of a password, a Personal Identification Number (PIN), a passphrase, a key sequence, and/or the like. Also, as used herein, the terms keypad and/or keyboard not only encompass physical keypads (pinpads), touchpads keyboard, and the like, but also touchscreen "virtual" keyboards or keypads, and the like.

As discussed above, basic IHS user authentication points may include a physical terminal, such as a keypad on an ATM, or the keyboard on a computer terminal. As noted, a basic way to steal someone's password is through the keyboard or Personal Identification Number (PIN) pad ("pinpad") they use to authenticate use of such a terminal. Furthermore, as noted, an attacker may go out of their way to steal such passwords of high value targets (such as a government official, or financial institution employees) including by using state-of-the-art attack vectors. Embodiments of the present systems and methods add an additional layer of protection against these attacks. One of the basic attack vectors against terminal authentication is Personal Identification Number (PIN)/password snooping. An attacker can (remotely) observe the key sequence a user types. For example, an attacker can observe and record what is being typed, using a high powered/long distance telescope. In cases of both short key sequences (such as at an ATM pinpad, or the like) or long key sequences (e.g., a Secure Shell Protocol (SSH) passphrase, or the like), the sequence can simply be observed/recorded, for later playback and processing, to prepare an authentication attack. Further, state-of-the-art attack vectors that may be used in this regard may include by way of example key-logging malware, or the like.

As noted, existing solutions which attempt to protect A PIN or password key sequence against snooping include rudimentary, physical efforts such as covering the pinpad or keyboard while typing, or in the case of a small numerical-only pinpad (square, nine-digit area), the pinpad can be covered by one hand, while the other hand types. In general, for both pinpads and keyboards, there may be a physical cover over the keys, blocking remote observation. However, these approaches have a variety of problems and shortcomings. For example, typing with the key area covered blocks the user's view also, such that it would be difficult for users who do not touch-type to use such a keypad or keyboard. If the keyboard is only partially covered, such as to allow the user to see the keyboard, the typing fingers will not be covered, and hence, the finger typing motions can be observed to replicate later. A determined attacker may extract a variety of observed data from login observations or recordings, to extrapolate the key sequence. This observed data might, by way of example, include placement of the user's fingers on the keyboard, motion of the user's fingers (in three dimensions) as the user's fingers move across the keyboard, clicking (or other) sounds, such as in a pattern (such information may referred to as "PMC"). The attacker can reconstruct a simple pin, or with more effort a password, passphrase, or the like, from this PMC information.

However, for longer key sequences (such as passphrases), the attacker may, a priori, construct PMC for the entirety of the victim's dictionary. For example, the attacker can create PMC models for all the words of the user's language(s), plus all known popular passwords. Then, the attacker can overlay the PMC observed in the recording, against the PMC model from the dictionary. Matches between the PMC model and the recorded PMC can be used as candidate sequences to log in. To further enhance the probability of success, the attacker can use statistical analysis to recreate actual words from the dictionary, in case the user used dictionary words as their passphrase.

Keystroke logging, often referred to as keylogging or keyboard capturing, is the action of recording (logging) the keys struck on a keyboard, typically covertly, so that a person using the keyboard is unaware that their actions are being monitored. Data can then be retrieved by the person operating the logging program. A keystroke recorder or keylogger can be either software or hardware. While the programs and hardware themselves are legal, keyloggers are, as noted, most often used as a form of malware, for stealing logins, passwords and other confidential information.

As noted, existing solutions may use biometrics to improve the security of logins, by requiring biometrics to amend or replace PIN sequences or passphrases. However, biometrics are also problematic. For example, not all users will want to share their biometrics as means of authentication, for privacy reasons. Also, biometrics are immutable, so, once compromised, a biometric will be compromised forever. High value targets are also targets for theft, cloning copying, etc. of their biometrics. Once these biometrics are stolen, they are useless, forever, for authentication purposes. If someone steals a high value target's fingerprints, iris pattern or other biometric, this high value target can never change the stolen biometric(s) thus their authentication using (the) stolen biometric(s) is forever compromised. Further, the use of biometrics for user authentication requires special equipment, which may be relatively costly, difficult to maintain, unreliable for use (particularly in certain (weather) conditions), or the like.

As also noted, Multi Factor Authentication (MFA) can be used to increase the security of login session by asking for an additional independent verification (identity or separate value/token). However, when users use their mobile phone, or the like, as their main terminal (to authenticate a service), and they use the same device as their second authentication device, the second identification is not really independent, disabling much of the main advantage of MFA. That is, the MFA device could similarly be snooped-on (remotely), in the same manner as the authentication terminal itself. Further, in the case of ATM access, banks typically do not employ MFA, for convenience reasons.

Embodiments of the present systems and methods for security through (by) randomized dynamic keyboard or keypad transformation provide security for entry of logins, PINs, passwords, passphrases, or the like, by introducing random transformations of a user's key sequence at the point of input. Embodiments of the present systems and methods may be used alone or added as an additional layer of security on top of existing solutions, by introducing the random transformations of a user's key sequence at the point of input.

FIG. 2A is a diagrammatic illustration of example of typical pinpad (keypad) 200. FIGS. 2B and 2C are illustrative examples of pinpad dynamic transformation, where the key values are changes, in accordance with some embodiments of the present systems and methods. For example, FIG. 2B is a diagrammatic illustration of example dynamic transformation 210 where the key values of the pinpad of FIG. 2A are changed by being swapped by position, in accordance with some embodiments. Whereas, FIG. 2C is a diagrammatic illustration of example dynamic transformation 220 where the key values of the pinpad of FIG. 2A are changed by increasing a value of each original character, by plus two, in accordance with some embodiments.

Figure 3A:
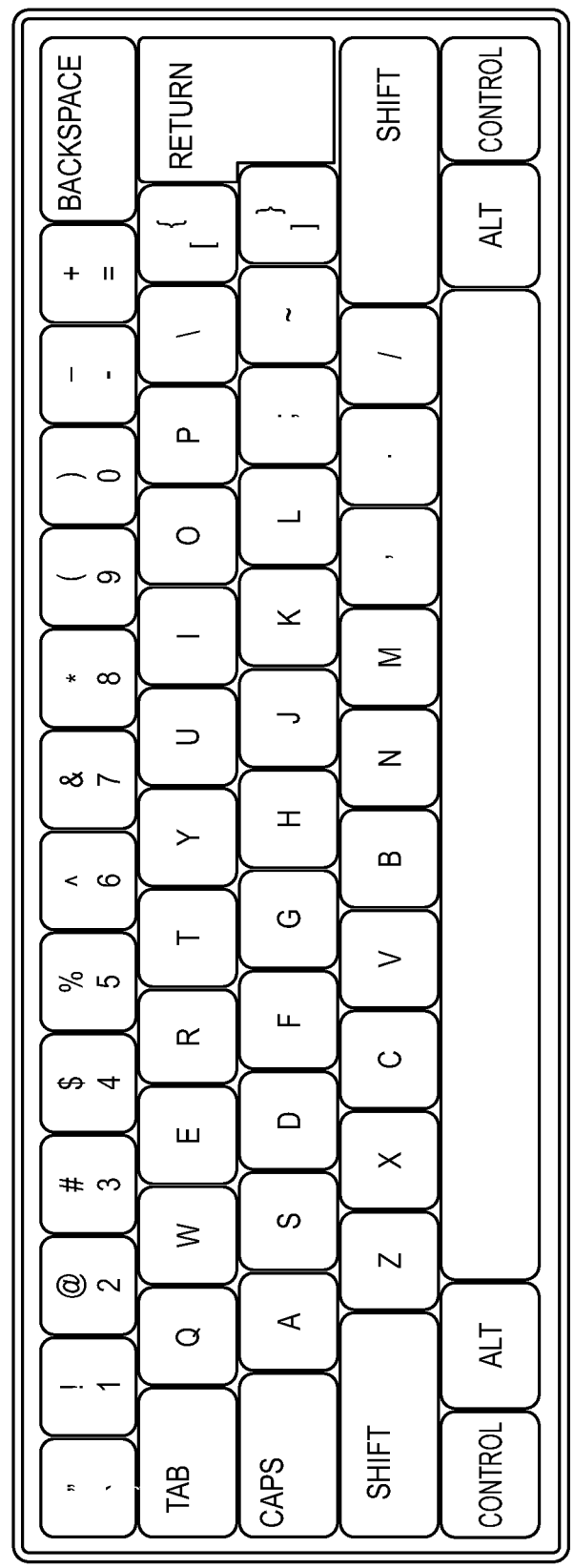
FIG. 3A is a diagrammatic illustration of an example of a typical keyboard.
Figure 3B:
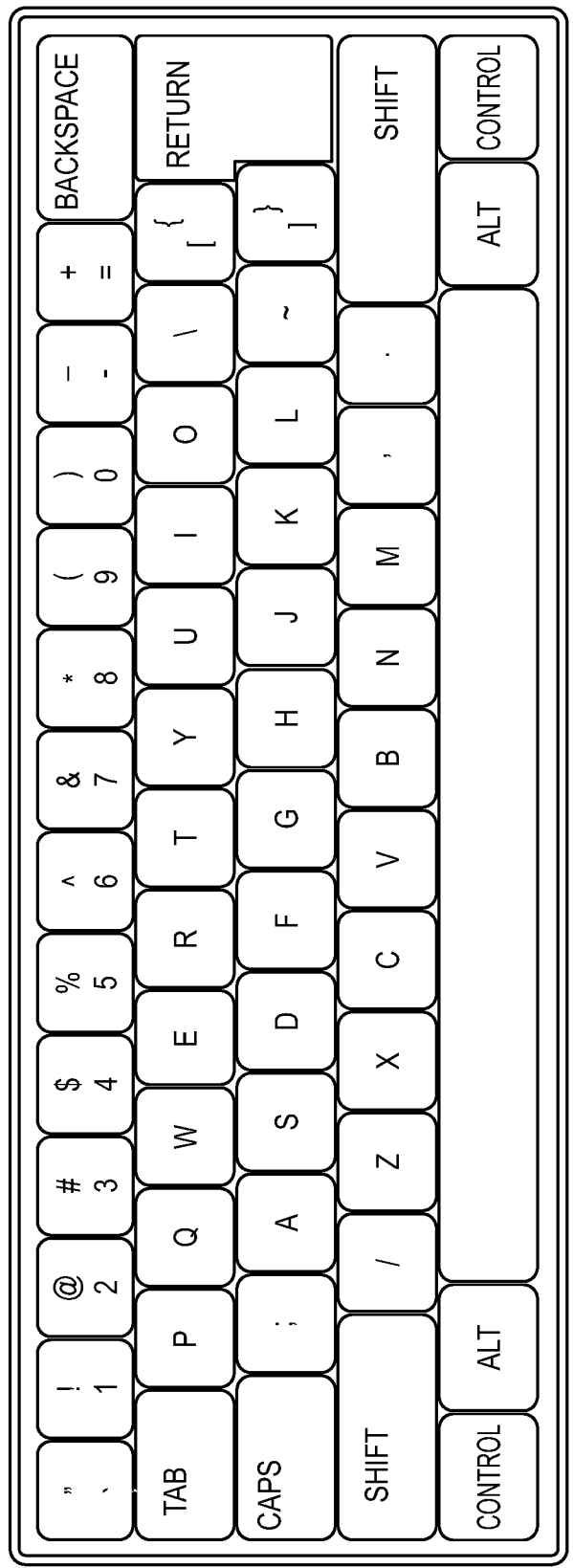
FIG. 3B is a diagrammatic illustration of an example of a dynamic transformation where the key values of the keyboard of FIG. 3A are changed by being shifted by one to the right, in accordance with some embodiments.

Likewise, FIG. 3A is a diagrammatic illustration of example of a typical keyboard 300. FIG. 3B is an illustrative example of keyboard dynamic transformation 310 where the key values are changed. That is, FIG. 3B is a diagrammatic illustration of example dynamic transformation 310 of key values of keyboard 300 of FIG. 3A, wherein the key values of keyboard 300 are changed by being shifted by one to the right, in accordance with some embodiments.

Figure 4:
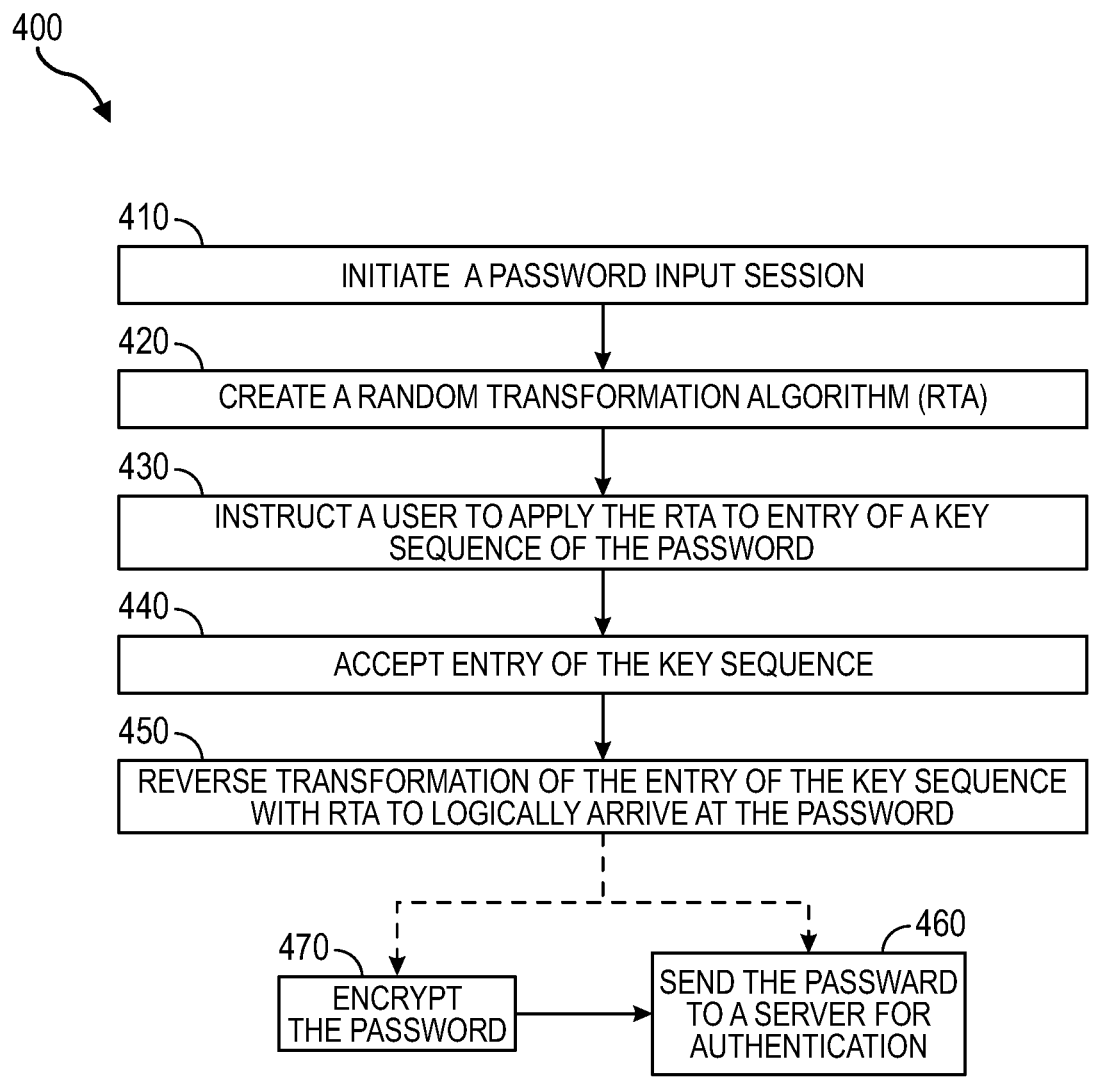
FIG. 4 is a flowchart of an example process for security through randomized dynamic keyboard or keypad transformation, in accordance with some embodiments.

FIG. 4 is a flowchart of example process 400 for security through randomized dynamic keyboard or keypad transformation, in accordance with some embodiments. Therein, at 410, a password input session is initiated on an input terminal, or the like (IHS 100). In response, the terminal creates a Random Transformation Algorithm (RTA) that is unique to this authentication session at 420. For example, (a) processor(s) (102) of the terminal may execute stored program instructions to initiate the password input session at 410, create the RTA at 420, and otherwise carry out embodiments of the present systems and methods, such as described below. This transformation may comprise one or more options or combination of options, as discussed in greater detail below. Different sessions may use different transformations or combinations of transformations, as also discussed below, which may be randomly selected and/or combined for each such session.

In one example, characters may be swapped by position, such as swapping every pair of characters, which could, by way of example, transform "abcd" into "badc." In another example, characters may be swapped by value, such as, by way of example, swapping all instances of "1" with "3," and vice versa, such that "123456" would become "321456." Such an example transformation (210) is shown in FIG. 2B discussed above, with respect to a key/PIN pad (200). In a further example, character values may be shifted up or down by a particular (i.e., a specific (specified) or certain) amount. For example, each character may be made two values higher, such that "123" would become "345," such as illustrated in FIG. 2C, as example transformation (220) discussed above, with respect to a key/PIN pad (200). Conversely, the RTA may make each character two values lower, such that "987" would become "765." In another example, all characters may be moved on a keyboard, in a particular (i.e., a specific (specified) or certain) direction. For example, the RTA may shift the mapping of keys on a QWERTY keyboard, to the right, such that, by way of example, as shown in FIG. 3B, as transformation 310, an original keyboard mapping (300) would become a shifted keyboard (310), wherein, when a user would normally type "r", they would instead type "t." These examples above are basic and normalized, for clarity. As one of skill in the art would appreciate, any number of transformations could be created as an RTA, in accordance with embodiments of the present systems and methods.

Additionally, RTA options can be combined by the RTA, such as in a sequence, for enhanced security. For example, a RTA can be, shift all values to the right as per QWERTY keyboard mapping, such that "asdf" becomes "sdfg," and increase all values by two, in the alphabet, such that this "sdfg" becomes "tegh."

The above RTA examples are provided for purposes of illustrating the principles of the present systems and methods at a high level. However, any number of transformations are available under embodiments of the present systems and methods. For example, "rotation" and/or "flipping," such as, by way of example, on a rectangular 3×3 numeric pinpad, the pinpad may be "virtually" "rotated" by the RTA, left or right, by 90, 180 or 270 degrees, around any axis (e.g., around an axis perpendicular to the surface, or any axis that is part of the surface). In another example, a wide keyboard (such as a laptop or desktop keyboard) can also be transformed by the RTA in a similar manner (but not in a manner that cannot be applied in accordance with embodiments of the present systems and methods, e.g., 90 degree rotation of a wide keyboard may be problematic to implement and/or communicate to a user).

In accordance with the foregoing, the terminal does not need to "know" the user's authentication sequence, or anything about the user's authentication sequence, in order to create the RTA.

Once the terminal creates the RTA at 420, but before the user types in in the key sequence, the terminal, at 430, instructs the user to apply this transformation to type in the key sequence. The user would transform the password key sequence (e.g., "asdf" into "sdfg," using the example sequence RTA above) to enter the authentication sequence. The terminal may communicate the RTA instructions to the user at 420 via one of multiple channels, including, but not limited to the following. Via a terminal display/monitor (126), perhaps, in some embodiments, under a cloak cloth, behind a refractive screen, etc., to prevent snooping. Via a computer generated voice, in some embodiments, via terminal-connected headphones (e.g., connected to an output port 114), or via voice using sound/noise cancelation, to avoid sound snooping. Through a third party device (such as through an app on a user's smart phone, a push notification, (SMS) text to such a smartphone, or the like). Thusly, to communicate the RTA from the authentication terminal to the third party device, another communication channel (such as Wi-Fi, cellular data or BLUETOOTH) may be used, and may be presented to the user visually, audibly, etc. However, in some embodiments of the present systems and methods, a keyboard adapted to receive instructions from the terminal, may provide tactile, haptic or visual feedback, or the like, to the user may be used to communicate the transformation to the user. For example, when the user's finger touches a key, the key can indicate to the user that the user's keystroke needs to move several steps in a particular (i.e., a specific (specified) or certain) direction, for the substitution to work in accordance with the present systems and methods. In such embodiments, silent or tactile (similar to Braille) or haptic feedback may be used are preferred to avoid visual snooping. For example, haptic feedback may be provided through active vibration of (a) key(s) indicating a direction of shift for such input, through active (dynamic) Braille output on keys, and/or the like. To further enhance security, the RTA instructions can be communicated to the user via a combination of channels, for example, a text or push notification to tell the user to open the app on their smart phone, and login (using biometrics via the smartphone) to receive the RTA instructions. Additionally, or alternatively, to (even) further enhance security, RTA instructions can be communicated to the user via (a) channel(s), or combination of channels that (randomly) change between authentication sessions.

At 440, the terminal (IHS 100) accepts entry of the key sequence, from the user, via the keyboard and/or keypad. That is, as the user types the transformed key sequence into the terminal keyboard, such as, using the example above, the user types in "sdfg" instead of "asfd," the terminal receives the entry of the key sequence.

While embodiments of the present systems and methods are described with respect to communicating the RTA to the user at 430 for the user to apply the RTA mapping to entry of the key sequence for receipt at 440, some embodiments of the present systems and methods may communicate the RTA to the user through a dynamically generated map, which the terminal may communicate to the user, out of line (e.g., via a third party device, or the like, such as described above.

At 450, following acceptance of the user-entered key sequence at 440, the terminal (IHS 100) internally reverses the transformation to logically arrive at the passphrase, such as, in the above example, "asdf." That is, the terminal reverses the transformation of the entry of the key sequence in accordance with the RTA to logically arrive at the password.

At 460, the password resulting from 450 is sent to a server, or the like, such as in a normal course of password authentication, for verification. However, the terminal may, at 470, additionally encrypt the password resulting from 450, which again may be in a normal course of password authentication. Then the terminal sends the encrypted password to the server, or the like, at 460, in the normal course of password authentication, for verification. Additionally, or alternatively, the various steps described above may be carried out within a (terminal) hardware security module (HSM), including, in some embodiments, the password authentication.

Figure 5:
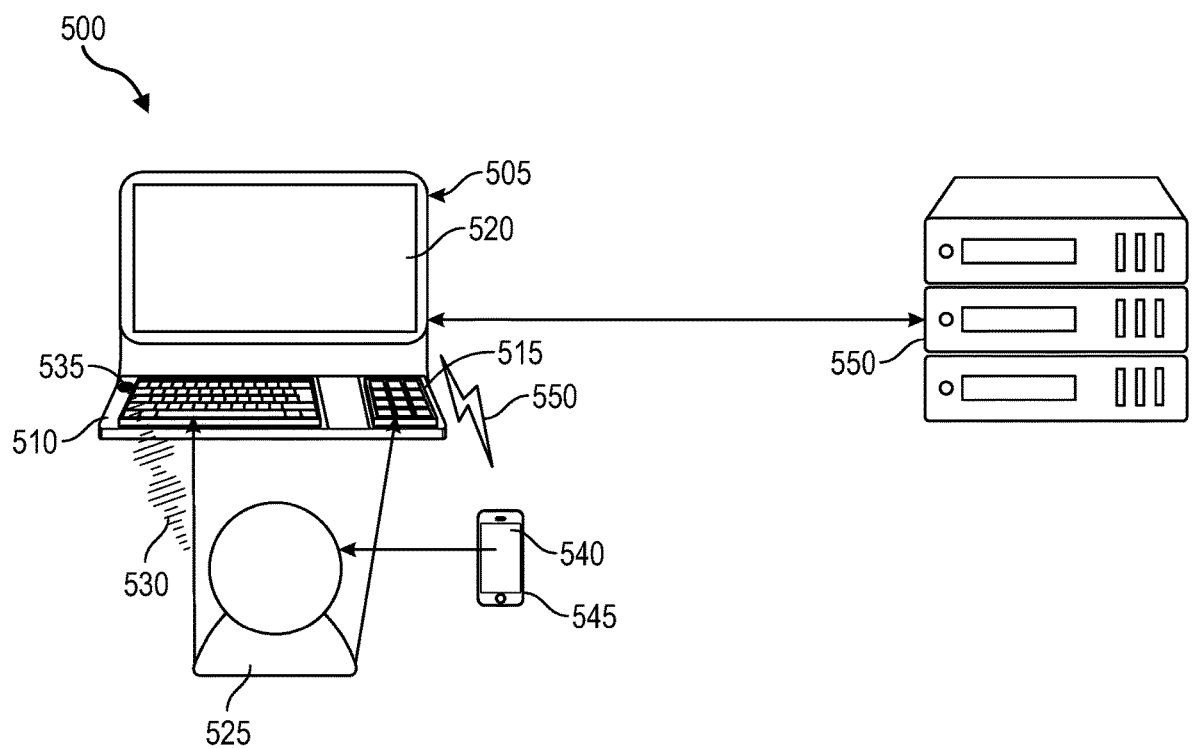
FIG. 5 is a block diagram illustrating an example implementation of security through randomized dynamic keyboard or keypad transformation, in accordance with some embodiments.

FIG. 5 is a block diagram illustrating example implementation 500 of security through randomized dynamic keyboard or keypad transformation, in accordance with some embodiments. Terminal (IHS) 505 may include keyboard 510 and/or keypad (pinpad) 515, and display/monitor 520. A processor (102) of the terminal is coupled to the keyboard and/or keypad and the display/monitor. A memory coupled to the processor has program instructions stored thereon that, upon execution, cause the processor to (cause the terminal to) initiate (410) a password input session for user 525 and create an RTA (420). Terminal 505 (processor) then instructs (430) user 525 to apply the RTA to entry of a key sequence of the password, on keyboard 510 or keypad 515.

Terminal 505 (processor) may instruct user 525 to apply the RTA to entry of the key sequence of the password by communicating RTA instructions to the user via terminal display/monitor 520, via audible instructions 530 from speaker 535, via a third party device such as app 540 through user's smart phone 545, via Wi-Fi, cellular data, BLUETOOTH, or other wireless media 550, or via keyboard 510 or keypad 515, itself. Terminal 505 (processor) may cause keyboard 510 or keypad 515 to provide tactile, haptic or visual feedback to user 525, such as described above.

Terminal 505 (processor) accepts (440) (i.e., receives) the user entry of the key sequence on keyboard 510 or keypad 515. Terminal 505 (processor) the reverses (450) transformation of the entry of the key sequence, in accordance with the RTA, to logically arrive at the password, before encrypting (470) and sending (460) the password to authentication server 555 for verification (in a usual manner). As noted, in some embodiments, the various steps described above may be carried out within a hardware security module (HSM) in terminal 505, including, in some embodiments, the password authentication.

In accordance with the foregoing, embodiments of the present systems and methods employ creation of a unique RTA, per authentication session and compel a user to modify their authentication sequence when typing it in. One or more different channels, which may change between authentication sessions, may be used to communicate the RTA to the user, before the user types in the transformed login key sequence. This adds an additional layer of security onto existing authentication methods, particularly in that relative uniqueness of the RTA in each session protects the information snooped in one authentication session from being used in a later authentication session. Embodiments of the present systems and methods thereby provide improved security, not only against visual snooping of passphrases, passwords, PINs, and the like, but also against keylogging malware, and the like, since application of the RTA by the user will result in keying of a sequence that is different than the actual passphrase, password, PIN, or the like. Applying the RTA requires marginal effort by the user, embodiments of the present systems and methods can be adopted relatively easily, especially compared to such onerous security methods as requiring the user to touch-type on a hidden keyboard.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of Machine Learning (ML) software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Embodiments of the present systems and methods may employ ML, Artificial Indigence (AI), or the like, in a smart keypad and/or keyboard, or terminal, to learn which RTA transformations to employ, such as by determining which RTAs yield more, or less, authentication successes, thus learning to apply those RTAs which are effective both security-wise and ease-wise. Additionally, or alternatively, ML, AI, or the like can adapt an RTA set to each user, thus making RTA more customized, and effective, to each user.

Thusly, in various embodiments, aspects of systems and methods described herein may be implemented, at least in part, using ML. As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, AI, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a keyboard and/or keypad;
a display;
a processor coupled to the keyboard and/or keypad and the display; and
a memory coupled to the processor, the memory having program instructions stored thereon that, upon execution, cause the processor to:
  initiate a password input session;
  create a random transformation algorithm (RTA) that defines a transformation of an input character sequence to a transformed character sequence different from the input character sequence;
  instruct a user of the IHS to apply the RTA to entry of a character sequence of the password by changing an input character sequence of the password to a transformed character sequence of the password, wherein instruct the user comprises communicate RTA instructions to the user via a third party device;
  accept from the user entry of the transformed character sequence of the password via the keyboard and/or keypad; and
  reverse transformation of the user entry of the character sequence in accordance with the RTA to logically arrive at the password.

2. The IHS of claim 1, wherein upon execution, the program instructions further cause the processor to, following reversing transformation of the entry of the character sequence, encrypt and send the password to a server for authentication.

3. The IHS of claim 1, wherein the IHS is an input terminal.

4. The IHS of claim 3, wherein the input terminal is an automated teller machine.

5. The IHS of claim 1, wherein, upon execution, the program instructions further cause the processor to create the RTA by one or more of:
swapping keyboard and/or keypad characters by position;
swapping keyboard and/or keypad characters by value;
shifting keyboard and/or keypad character values up or down by a particular amount;
geometrically moving keyboard and/or keypad characters in a particular direction, by a particular amount; and
rotating keyboard and/or keypad characters in a particular direction about an axis, by a particular amount.

6. The IHS of claim 1, wherein, upon execution, the program instructions further cause the processor to instruct the user to apply the RTA to entry of the character sequence of the password by communicating RTA instructions to the user via the keyboard.

7. The IHS of claim 1, wherein, upon execution, the program instructions further cause the processor to instruct the user to apply the RTA to entry of the character sequence of the password by communicating RTA instructions to the user via the display.

8. A method comprising:
initiating, by an Information Handling System (IHS), a password input session;
creating, by the IHS, a random transformation algorithm (RTA) that defines a transformation of an input character sequence to a transformed character sequence different from the input character sequence;
instructing, by the IHS, a user of the IHS to apply the RTA to entry of a character sequence of the password by changing an input character sequence of the password to a transformed character sequence of the password, wherein RTA instructions are communicated to the user at least via a third party device using haptic feedback comprising vibration of one or more keys of a keyboard operably coupled with the IHS, and wherein the vibration of the one or more keys indicates a direction of shift of the input character sequence to apply the RTA;
accepting from the user, by the IHS, entry of the transformed character sequence of the password; and
reversing, by the IHS, transformation of the entry of the character sequence in accordance with the RTA to logically arrive at the password.

9. The method of claim 8, further comprising, following reversing transformation of the entry of the character sequence, encrypting and sending the password to a server for authentication.

10. The method of claim 8, wherein the IHS is an input terminal.

11. The method of claim 10, wherein the input terminal is an automated teller machine.

12. The method of claim 8, wherein creating the RTA comprises one or more of:
swapping keypad and/or keyboard key characters by position;
swapping keypad and/or keyboard key characters by value;
shifting keypad and/or keyboard key character values up or down by a particular amount;
geometrically moving characters on a keypad and/or keyboard in a particular direction, by a particular amount; and
rotating keyboard and/or keypad characters in a particular direction about an axis, by a particular amount.

13. The method of claim 8, wherein instructing the user to apply the RTA to entry of a character sequence of the password comprises communicating RTA instructions to the user via the keyboard of the IHS, using at least active Braille output on keys of the keyboard to indicate a direction of shift of the input character sequence to apply the RTA.

14. The method of claim 8, wherein instructing the user to apply the RTA to entry of a character sequence of the password comprises communicating RTA instructions to the user via a display of the IHS.

15. A non-transitory computer readable medium having program instructions stored thereon that, upon execution by an Information Handling System (IHS), cause the IHS to:
initiate a password input session;
create a random transformation algorithm (RTA) that defines a transformation of an input character sequence to a transformed character sequence different from the input character sequence;
instruct a user of the IHS to apply the RTA to entry of a key sequence of the password by changing an input character sequence of the password to a transformed character sequence of the password, wherein RTA instructions are communicated to the user at least via a third party device using haptic feedback comprising vibration of one or more keys of a keyboard operably coupled with the IHS, and wherein the vibration of the one or more keys indicates a direction of shift of the input character sequence to apply the RTA;

accept from the user entry of the transformed character sequence of the password via the keyboard and/or a keypad; and reverse transformation of the entry of the character sequence in accordance with the RTA to logically arrive at the password.

16. The non-transitory computer readable medium of claim 15, wherein, upon execution by the IHS, the program instructions further cause the IHS to, following reversing transformation of the entry of the character sequence, encrypt and send the password to a server for authentication.

17. The non-transitory computer readable medium of claim 15, wherein, upon execution by the IHS, the program instructions cause the IHS to create the RTA by one or more of:

swapping keypad and/or keyboard key characters by position;

swapping keypad and/or keyboard key characters by value;

shifting keypad and/or keyboard key character values up or down by a particular amount;

geometrically moving characters on a keypad and/or keyboard in a particular direction, by a particular amount; and rotating keyboard and/or keypad characters in a particular direction about an axis, by a particular amount.

18. The non-transitory computer readable medium of claim 15, wherein, upon execution by the IHS, the program instructions further cause the IHS to instruct the user to apply the RTA to entry of a character sequence of the password by communicating RTA instructions to the user further includes one or more of: a display of the IHS and the keyboard or keypad, wherein the keyboard or keypad is configured to use active Braille output on keys of the keyboard to indicate a direction of shift of the input character sequence to apply the RTA.

* * * * *